Oct. 11, 1960     A. HARTZMARK     2,955,637

PRESS LOCK RING FOR LAMINATED TIRES

Filed Oct. 1, 1957

Alan Hartzmark
        INVENTOR.

United States Patent Office 2,955,637
Patented Oct. 11, 1960

2,955,637
PRESS LOCK RING FOR LAMINATED TIRES
Alan Hartzmark, 3621 E. 91st St., Cleveland, Ohio
Filed Oct. 1, 1957, Ser. No. 687,564
1 Claim. (Cl. 152—397)

The present invention generally relates to a locking ring construction and more particularly to a press lock ring in the form of a metal band which is pressed onto a solid wheel for the purpose of holding in place a laminated tire to prevent relative rotation between the laminated tire and the wheel.

An object of the present invention is to provide a lock ring for securely fastening a laminated tire to a solid wheel.

Another object of the present invention is to provide a press lock ring having a press fit on a solid wheel together with radially extending fins which are embedded in the laminated tire to prevent slippage of the tire in relation to the wheel.

Another object of the present invention is to provide a press lock ring which is simple in construction, dependable, well adapted for its particular purposes and relatively inexpensive to manufacture.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
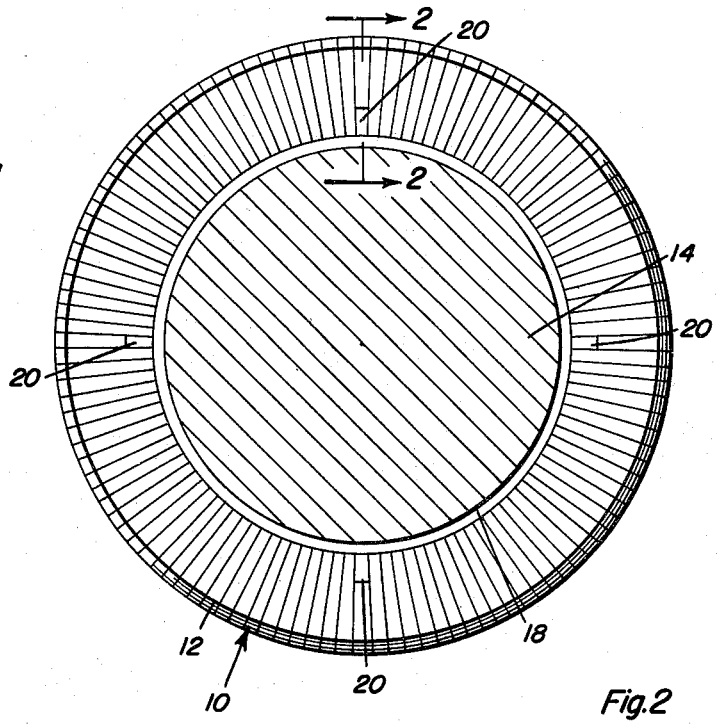
Figure 1 is a side elevational view of the press lock ring installed on a solid wheel which is shown in section and holding a laminated tire thereon.
Figure 2:
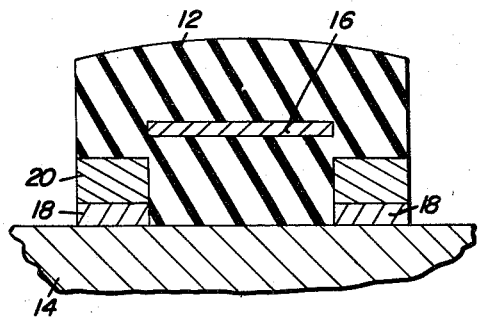
Figure 2 is a transverse sectional view taken substantially upon a plane passing along section line 2—2 of Figure 1 illustrating the relationship of the pair of press lock rings, the fins thereon and the laminated tire together with the securing ring for holding the blocks of the tire in assembled relation.
Figure 3:
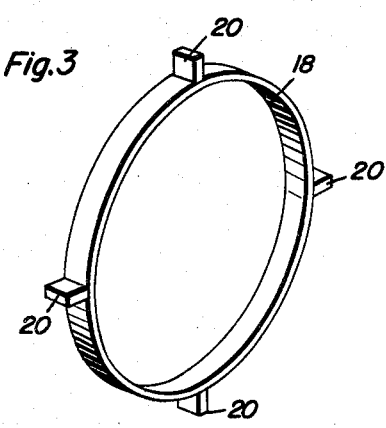
Figure 3 is a perspective view of the press lock ring of the present invention.

The numeral 10 generally designates a laminated tire comprising a series of blocks of rubber or alternating rubber and fabric as designated by the numeral 12 which are mounted on a solid wheel 14. The blocks 12 are retained in assembled relation by an annular metal band 16 disposed generally in the center thereof and are secured to the wheel 14 by a pair of annular rings 18 each of which is provided with four circumferentially spaced projecting fins 20 which extend radially from the ring 18. The rings 18 are press fitted onto the wheel 14 and the fins extending radially from the outer surface thereof are embedded in the laminated tire 10 to prevent relative rotation between the laminated tire 10 and the solid wheel 14.

There is presently being used a solid wheel such as member 14 on material handling equipment and on some highway trucks in construction with a press-on solid tire. The press-on solid tire may be defined and is manufactured as a tire having a steel base band and rubber bonded by a suitable adhesive bonding agent to the base band by means of a curing operation employing heat and pressure and including in most cases the use of a mold or matrix. On the other hand, a laminated tire may be defined as a tire having sections or pads of rubber or rubber and fabric in series such as members 12 which are fastened together to make an integral tire unit by means of a metal band, chain or cable such as the member 16 thereby making the association of the pads usable as a tire. To the present date, the press-on solid tire has been used on solid wheels, but the laminated tire has not been used on solid wheels for lack of a suitable fastening or locking device. Recognizing this problem and the need for reduction of down time on material handling equipment used under severe operating conditions in industrial plants, such as steel mills, smelting plants, foundries, or the like, and knowing that a laminated tire provides a longer tire service record thus reducing production delays, handling delays, maintenance downtime delays and generally improving the over-all efficiency of the material handling operation at a reduced cost, I have provided the press lock ring of the present invention which is a device making possible the fastening of the laminated tire to the solid wheel. Two rings 18 are used on each solid wheel, one on each side of the tire and the ring may be made of metal preferably of steel. The inside diameter of the ring must be manufactured according to the solid wheel size that it is to be pressed on and this side can vary in scope to include all sizes of solid wheels at present being manufactured and those contemplated in the future. To arrive at the correct size of the wheel diameter dimension, a piece of metal can be manufactured having a specified wall thickness as well as inside and outside diameter and then the inside diameter can be machined to a specified dimension for making possible a press fit. The press lock ring must be of sufficient thickness to prevent the tire from sliding over the ring metal in a lateral direction and also from sliding sideways and must be wide enough to prevent the rubber pads of the tire from bending over the edge of the wheel when the tire is under load and also must be wide enough to allow for a maximum grip hold between the ring and the wheel. The fin 20 acts as a stop to prevent the tire from turning circumferentially on the wheel and must be attached in sufficient numbers in a manner that is strong enough to prevent bending or breaking off. The ring is applied to the wheel and tire by first pressing one ring into the tire at the base and allowing the fins to be located any place and then this ring and tire are pressed onto the wheel far enough on to allow the ring to grip the metal of the wheel. Then the other ring is pressed on the opposite side and by applying pressure on both rings, the tire will be locked in place.

In conducting tests, I have found that a ring having the following dimensions could be effectively employed: Ring inside diameter 12⅛ inches plus .00 minus .027; ring metal thickness ½ inch; ring width 1½ inches; fin size 1½ inches long by ⅝ inch high by ¼ inch thick. The fins were arc welded to the band and four fins were used. The dimensions of the lock ring will vary as will the number of fins depending on the size of the wheel. The inside diameter of the band will be based on the wheel size and the outside diameter of the band could vary from the smallest thickness of metal to the heaviest thickness of metal. The width of the band could have a wide variation and the number of fins could also vary. Thus, with the present invention, a laminated tire may be employed which has structural features mounting it on a solid wheel by virtue of the press lock ring of the invention disclosed herein thereby eliminating any slippage between the laminated tire and the solid wheel.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A wheel assembly comprising a wheel having a continuous external surface defining a cylinder, a continuous annular tire having a radially inner surface in contact with the external surface of the wheel, said tire including a continuous band retaining the radially inner surface of the tire adjacent the external surface of the wheel, and means interconnecting the external surface of the wheel with the tire, said means including a pair of annular ring members having a radially inner surface press fitted onto the external surface of the wheel, the radially outer surface of each of said ring members having a plurality of radially extending and circumferentially spaced fins thereon, said fins being embedded into said tire with the portion of the tire disposed between the ring members preventing lateral movement of the tire, the portion of the tire between the fins on each ring member engaging the radially outer surface of the ring member, the axially outer edges of said ring members, fins and tire being coincidential whereby the ring members lock the tire to the wheel and form the sole means to preclude relative lateral and rotational movement between the tire and wheel.

References Cited in the file of this patent

UNITED STATES PATENTS

| | | |
|---|---|---|
| 739,658 | Dryden | Sept. 22, 1903 |
| 943,446 | McDuffee | Dec. 14, 1909 |
| 1,077,683 | Deery | Nov. 4, 1913 |
| 1,394,658 | Williams | Oct. 25, 1921 |
| 1,433,301 | Robb | Oct. 24, 1922 |
| 1,557,413 | Bronson | Oct. 13, 1925 |
| 1,658,623 | Wittkopp | Feb. 7, 1928 |
| 2,097,942 | Whitney | Nov. 2, 1937 |

FOREIGN PATENTS

| | | |
|---|---|---|
| 1,094,168 | France | Dec. 1, 1954 |